United States Patent [19]
Boal et al.

[11] Patent Number: 5,546,392
[45] Date of Patent: Aug. 13, 1996

[54] COMMUNICATIONS BUS AND CONTROLLER

[75] Inventors: John H. Boal, Winchester; Mark K. Newton, Reading, both of United Kingdom

[73] Assignee: Racal-Datacom, Limited, United Kingdom

[21] Appl. No.: 302,721

[22] PCT Filed: Mar. 9, 1993

[86] PCT No.: PCT/GB93/00494

§ 371 Date: Sep. 9, 1994

§ 102(e) Date: Sep. 9, 1994

[87] PCT Pub. No.: WO93/18599

PCT Pub. Date: Sep. 16, 1993

[30] Foreign Application Priority Data

Mar. 9, 1992 [GB] United Kingdom .................. 9205098

[51] Int. Cl.$^6$ .............................. H04L 12/40; H04L 12/64
[52] U.S. Cl. .......................... 370/60.1; 370/68.1; 370/79; 370/85.7; 370/85.11; 370/94.2; 370/95.1; 370/110.1; 370/118
[58] Field of Search ................................. 370/58.1, 58.2, 370/58.3, 60, 60.1, 68.1, 77, 79, 85.1, 85.2, 85.6, 85.7, 85.9, 85.11, 94.1, 94.2, 95.1, 110.1, 118; 340/825.5, 825.51, 825.52

[56] References Cited

U.S. PATENT DOCUMENTS

| 5,231,631 | 7/1993 | Buhrke et al. | 370/60 |
| 5,239,544 | 8/1993 | Balzano et al. | 370/94.2 |
| 5,258,979 | 11/1993 | Oomuro et al. | 370/95.1 |
| 5,327,428 | 7/1994 | Van As et al. | 370/94.2 |
| 5,381,410 | 1/1995 | Grenot | 370/60.1 |

FOREIGN PATENT DOCUMENTS

WO90/15493 12/1990 WIPO .
WO90/16121 12/1990 WIPO .

OTHER PUBLICATIONS

Huber and Keuhn, titled: "Modelling of a Multi–Queue Polling System with Arbitrary Server Interrupts for Idle––Slot–Concatenation Packet Switching Principle in a Hybrid CS/PS Node", published in Teletraffic Science for New Cost–Effective Systems, Networks and Services, 1989 pp. 521–528.

Yum and Wong, titled: "An Intergrated Services Local Area Network", published in *Infocom*, Apr. 1987 in the United States, pp. 999–1008.

Jon W. Mark, titled: "Intergrated Voice/Data Services On a Dual–Ring Local Area Network", published in IEEE Global Telecommunications Conference, Dec. 1983 in the United States, pp. 337–381.

Maurizio Decina, titled: "New Communication Transfer Modes For The Broadband ISDN", published in *VLSI and Computer Pheripherals*, May 1989 in the United States, pp. 4.67–4.70.

Limb and Flamm, titled: "A Distributed Local Area Network Packet Protocal For Combined Voice and Data Transmission", published in *IEEE Global Telecommunications Conference*, Dec. 1982 in the United States, pp. 303–308.

Theus, Taub and Balakrishnan, titled: "Futurebus Anticpates Coming Needs", published in *Electronics International*, Jul. 1984 in the United States, pp. 108–112.

*Primary Examiner*—Alpus H. Hsu
*Attorney, Agent, or Firm*—Pedro P. Hernandez

[57] ABSTRACT

The present invention provides for a communication bus (52) and controller (54) which can control communication in more than one communication mode on a TDM bus by inhibiting or interrupting communication in a first mode during communication in a second mode. The bus (52) includes a allocate channel for controlling the bandwidth allocation of the bus amongst the different communication modes.

21 Claims, 4 Drawing Sheets

COMMUNICATIONS BUS AND CONTROLLER

FIELD OF THE INVENTION

This invention relates generally to the field of communication buses and bus controllers and more particularly, this invention relates to a communication bus and bus controller which can handle multiple communication modes.

BACKGROUND OF THE INVENTION

Many communications buses and controllers have been developed using a number of communications modes on either parallel or serial buses depending on suitability for given applications.

Isochronous or Circuit Switched Services and Packet or Framed services are already widely used and Asynchronous Transfer Mode (ATM) or Cell services are being introduced. These three communications modes are briefly characterised as follows.

Isochronous Services require guaranteed synchronous access to the bearer—e.g. receipt or delivery of an octet at precisely 125 μsecs. Their most typical usage is to convey voice information at 64 Kb/s, however they are often used for data services to take advantage of the flexible and cost-effective switching and routing capabilities incorporated in the globally connected telephony networks. Historically these services were very prone to errors and thus voice services were typically noisy and data often unreliable. More recently network bearers have become much less error prone.

Cells are employed in the so called Asynchronous Transfer Mode (ATM) technology embodied in CCITT's B-ISDN, Bell Corp's Switched Multi-Megabit Data Service (SMDS), and IEEE 802.6 Metropolitan Area Network (MAN) standard. Cells are comprised of fixed length packets or frames, 53 octets long, of which 48 octets are user data created by a source user and then rapidly routed on the fly through ATM switches to their destination. To assure that acceptable end user service delay criteria are met, cells require either Deterministic Guaranteed Access to match some maximum value, or Statistical Access with a tolerable Quality of Service, or some combination of these.

Packet Services are by comparison with Isochronous and Cell services very delay tolerant, and typically an end user's real time usage of such services is very peaky. By serially multiplexing the needs of many users a more consistent level of traffic is usually supported over a fixed bandwidth channel. Thus a Packet bearer service must offer a Multi-User (and therefore arbitrated) statistically queued (and therefore delayed) Service. Packet services grew out of a need for more reliable transfer of data in spite of poor lines. Information integrity remains a major requirement of Packet services.

These three services can be ranked in terms of their access priority demands as: Isochronous, Cell and Packet. Thus Isochronous must take precedence over Cell, and Cell over Packet.

SUMMARY OF THE INVENTION

A communications controller in accordance with the invention advantageously controls communications in more than one communication mode on a TDM bus by inhibiting or interrupting communication in a first mode during communication in a second mode. This is particularly advantageous if the first mode is tolerant of delays and the second requires more rapid, guaranteed access to the bus. The controller according to the invention is therefore particularly advantageous if the first mode is a packet mode and the second is a cell mode.

In a particularly preferred embodiment the controller of the invention controls communication on an OSI physical layer TDM (time division multiplexed) bus in circuit, cell or packet modes in which, each TDM slot on the bearer may be associated with one of the three modes.

A physical layer multiplexed scheme offers relatively simple interfacing because above the TDM multiplexer, the packet, ATM (cell) and circuit services, can be seen as entirely independent of each other. In addition it will be shown that it requires very little additional logic to optionally support a simple node maintenance capability using the packet bus framing service.

Compared, for example, to three separate co-resident packet, cell and isochronous buses the combined bus offers considerable savings in the number of bus lines and bus drivers/receivers required. This reduces bus interface circuit area and offers cost savings, and a low pin count which makes possible the dualling of the bus to meet the resilience needs of high availability systems.

These savings are not without associated costs. This is most obvious when bus throughput and capacity are considered. The bus described here by way of example uses 16 bits for information passing. When operated at 16.384 MHz this bus supports an information rate of 260 Mb/s, which must be shared amongst the selected or configured services that may be employed within a given node.

In compensation for these overall throughput limitations it should be noted that the compact and economic implementation of the combined bus offers the possibility of up to 4 parallel co-resident buses in a single (144) connector, thereby providing over a Gigabit of bandwidth if required.

A dual bus option may be considered for physically larger systems, comprising a high speed local (rack) bus together with a slow speed global (inter-rack) bus. Reducing the bus speed permits reliable repeating of the bus signals and thereby propagation of the signals over a much larger assembly of separate backplanes. Whilst the overall backplane capacity may be reduced (from 260 Mb/s at 16.384 Mhz to say 85 Mb/s at 4.096 Mb/s), it is often found that the required per port rate for physically large systems is low.

Yet another alternative to such a scheme is a dual or even mixed rate bus of say 4 and 16 Mb/s within one TDM frame. This arrangement might be employed on "small" entry level systems or on many-ported physically large installations.

All these arrangements can be accommodated with the framework of the proposed bus design.

Space

Existing buses like Futurebus, etc, are very "pin intensive" and there can be serious congestion in the tracking of signals to board sockets. This may be further aggravated by the doubling (or more) of the number of bus signals as a result of the input/output transceivers close to the socket. The minimisation of the number of backplane signals associated with the bus of the invention is therefore advantageous.

Bandwidth vs Latency

It must be remembered that the objective of any service allocation scheme is to guarantee to a given service, a predictable amount of bandwidth per unit time, so that calculations regarding buffer sizing can be made. The bus user or interface designer is not simply dealing with bandwidth but also with latency. A major (but not the only) distinction between ISOCHronous, CELL and PACKET services is their different access and delivery latencies. In one "socket" the bus controller of the invention permits an interface designer to select the most appropriate information transfer mechanism to meet any given adapter's performance requirements.

It is important to note that through this kind of scheme, slots allocated to isochronous traffic can be controlled dynamically by a bus Master, thus reserving the minimum ISOchronous bandwidth at all times and providing the maximum bus bandwidth possible to all other services within the TDM frame. As far as individual service controllers are concerned they merely see "holes" in between their own spaces which they may use for their own needs.

Dynamic Bandwidth Allocation

In practical communications nodes, especially supporting Isochronous services, it is normal to dynamically alter their connectivity, in for example, a telephony voice Call Set Up and Tear Down process. Isochronous service facilities may be provided by a controller according to the invention to support this dynamic bus bandwidth allocation process by:

1) a configuration set-up which may change by time of day;

2) a configuration set-up which may change due to a card insertion or other system change 3) modification to the isochronous boundary as calls are set-up and released.

This re-allocation process involves the following steps:

1) Setting up of a new TDM frame template, by the use of the Packet service to all affected bus nodes.

2) Signalling with the "swap" bit in the TDM Framing slot that a template exchange should be executed by the bus nodes.

3) At the next TDM "swap" multi-frame boundary the previously loaded "background" template becomes the foreground template until the "swap" process is repeated.

BRIEF DESCRIPTION OF THE DRAWINGS

Specific embodiments of the invention will now be described in detail, by way of example, with reference to the accompanying drawings in which.

DESCRIPTION OF THE PREFERRED EMBODIMENT(S)

Figure 1:
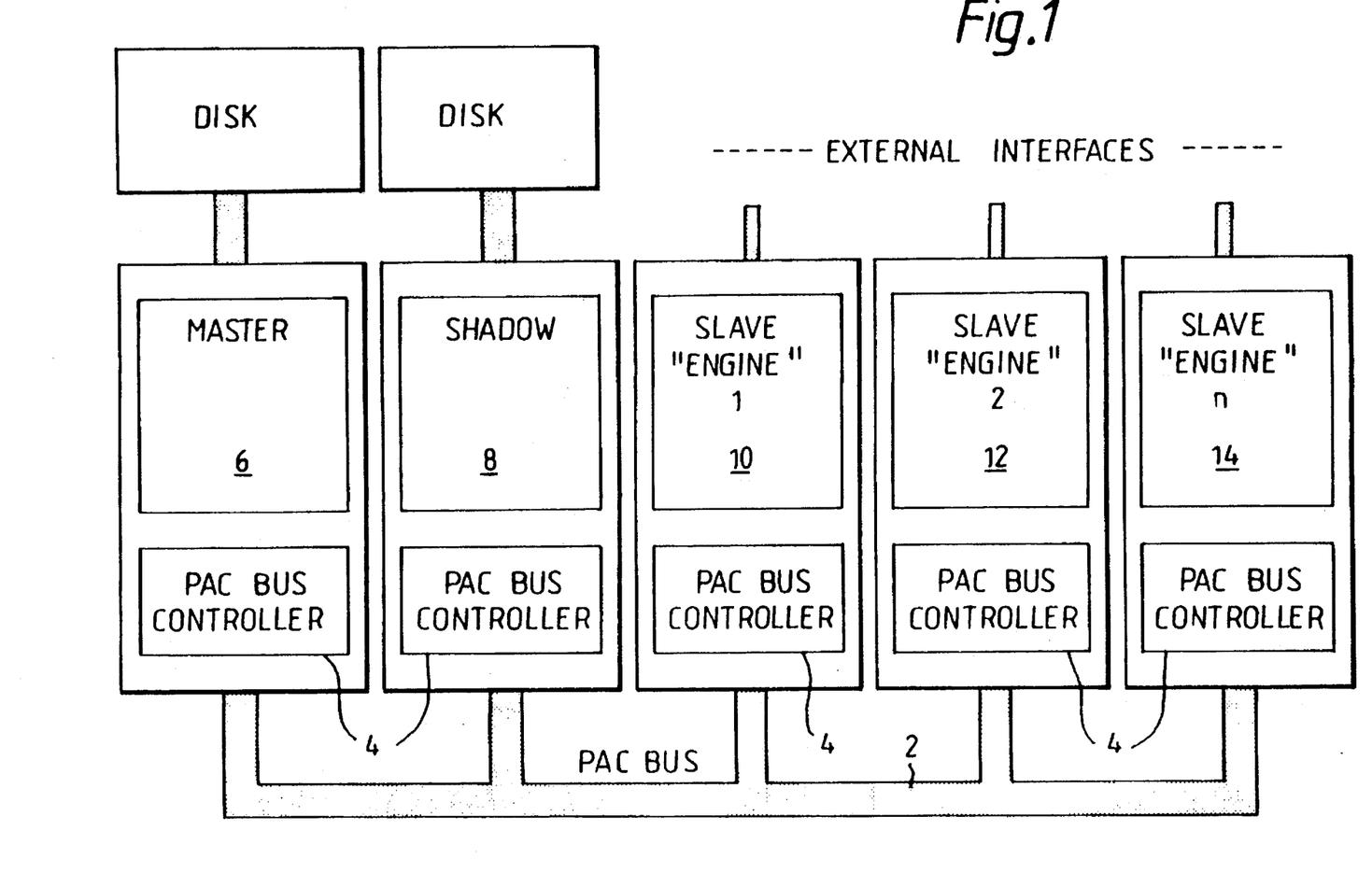
FIG. 1 is a block diagram of a packet, ATM and circuit bus according to the invention.

FIG. 1 shows a PAC (Packet, ATM (cell) and Circuit) bus 2 having coupled to it by means of PAC bus controllers 4 a plurality of nodes or sub-nodes including a bus master controller 6, a dualled shadow 8 for the bus master and three slave engines 10, 12, 14 connected to external interfaces.

The PAC bus uses an OSI physical layer TDM (time division multiplexed) bearer to support the three services, different TDM slots being associated with the packet, cell or circuit modes.

The bus master 6 serves to control the TDM timing of the bus and the bus clock as well as a number of functions of the bus which will be described below. For example it comprises a master bandwidth allocator for computing and distributing channel allocation templates, a node master or node bandwidth manager incorporated in the master bandwidth allocator for node-by-node pre-allocation and designation of cell transmission capacity, and a controller for a packet service arbitration scheme.

The PAC Bus—A Parallel Implementation

In this implementation the PAC Bus is based on an OSI time division multiplexed (TDM) backplane comprising 16 data lines, in which isochronous channels and cell bearer channels use pre-allocated slots specifically for isochronous (circuit) or for ATM (cell) traffic. Any remaining unused slots are aggregated into a single wideband channel used by the Packet service.

Circuit (isochronous) traffic is carried in specifically allocated timeslots which are referenced as an offset from an 8 KHz framing signal. Information is exchanged in two octets (one 16 bit word) to effect a full duplex sub-node to sub-node connection. The allocation of slots to specific sub-nodes can be dynamically changed through the use of foreground and background templates describing the allocation of slots to any attached sub-node.

A circuit (Isochronous) traffic controller does, and in fact must, have a prior knowledge of the slots in which it may accept or drive signals, but it does not need to be aware of the presence of the packet or cell controller.

Bus nodes that support the transfer of cells do so, at cell transmitters, by treating a contiguous block of 27 slots (53 octets+one node (cell) address octet) as a wide isochronous channel. Cell receivers can recognise, from the bus signals and the cell address octet, that a cell is to be accepted based on the bus signals alone, without any prior knowledge. The cell service can either be connection oriented or a connectionless datagram service.

Constraint on the use of the bus bandwidth for the conveyance of cells, is imposed by pre-allocation of a maximum cell transmission capacity to individual bus nodes by a node bandwidth manager. The typical (average) transmitter cell bandwidth will normally be significantly less than the allocated maximum. If there is no 'cell' information to send the cell transmitter provision is made to dynamically re-allocate cell bandwidth to the Packet service. The transfer of cells (53+1 octets) like isochronous traffic preempts packet traffic.

Guaranteed access to the bus, within the allocated constraint, is assured by a bus bandwidth manager that allocates cell channels to the attached cell transmitters in a mutually exclusive manner. Packet traffic is conveyed over the same 16 bit wide bus lines which are used to exchange 2 octets in the case of Isochronous (Circuit) traffic. Most typically the vast majority of the TDM frame is un-allocated space providing a very wideband channel for support of a Packet service.

The operation of the packet service is completely transparent to the circuit traffic and vice-versa. This is achieved with a separate bus ALLOCATED line or access-control line. Before circuit or cell traffic is driven into a TDM slot the Packet Bus Controller is temporarily frozen for one or more periods. The Packet traffic thus becomes fragmented at the physical level.

The packet service does not need prior knowledge, through some pre-allocation scheme, of the whereabouts of its own slots—it merely uses those slots which are not used by circuit or cell traffic.

A node maintenance service can also be provided based on the use of fully validated packet bus headers (datagrams) specifically addressed to an assigned Maintenance service. This facility would typically be offered to the PAC bus user as a byte wide pseudo-shared RAM interface. This provides a simple direct host processor interface that permits ROM-less boot, and fast short (e.g. 256 octet maximum) packet header information inter change.

Physical Arrangement

The PAC bus interface comprises 20 lines, carrying a 16 bit wide data path, a 16.3845 (4.096) MHz bus clock, a reference clock, a Control signal and an Allocated signal or access-control signal.

The bus signals are shown in Table 1.

Signal Descriptions

ALLOCATED (true=allocated: false=unallocated)

This signal distinguishes between allocated (isochronous or cell) and unallocated (packet) use of the bus and combined with the COMMAND signal permits Packet traffic and either Cell or Isochronous traffic to be managed independently.

The signal is normally driven by a Master Bandwidth Allocator (which may be shadowed for resilience reasons). In addition ATM cell transmitters may drive this signal to the UNALLOCATED state when they have no cell traffic to send. The signal is used by all attached devices to correctly de-multiplex packet, cell and isochronous data.

CONTROL (true=control: false=data)

This signal when asserted indicates that the content of the INFOrmation lines should be interpreted as control signals rather than (user) data signals.

This signal, according to the state of the ALLOCATED signal, is driven either by the last Packet Handler to have acquired the use of the bus, by a Cell Transmitter with a cell to send, or in the case of Isochronous slots by the Master Bandwidth Allocator.

The CONTROL signal is used by packet devices to sequence phases of the packet transfer protocol. In this case the INFOrmation data lines are encoded with a STATE (bits 0 to 3) and a QUALIFIER bits (4 to 15).

In the case of CELL transfers the EVEN INFO octet (bits 0 to 7) contains the first CELL octet and the ODD INFO octet contains a CELL indicator in bit 15 (CELL=1) and a Cell based sub-node address in bits 8 to 14.

Finally in the case of isochronous bus cycles INFO bit 15 indicates (FRAMING=0) if the cycle is an Isochronous TDM framing cycle issued by the PAC bus Master for a TDM timing reference. Bit 0 may also be encoded to indicated that the bus bandwidth should be re-allocated (SWAPped) synchronously by all attached isochronous and cell devices by the exchange of foreground and background templates.

This signal may be driven by the packet, cell or circuit service controllers. Whilst the ALLOCATED signal remains un-asserted the last packet controller to have acquired the use of the bus may assert the CONTROL signal to accomplish a packet service state change. These state changes are used to sequence the phases of the packet transfer protocol. Simultaneously the bus INFOrmation data lines are encoded with a STATE (bits 0 to 3) and a QUALIFIER (bits 4 to 15).

Whilst the ALLOCATED signal is asserted during designated Cell slots the designated Cell Controller asserts the CONTROL signal during the first octet of a transmitted cell to indicate the start of a cell transmission. Simultaneously on the bus the INFOrmation lines contain a CELL indicator in bit 15 (CELL=1), the first CELL octet (bits 0 to 7) and the Cell based sub-node address bits 8 to 149. Bit 15 (the CELL indicator) is used to distinguish this event from the TDM framing event below.

Whilst the ALLOCATED signal is asserted the Master Bandwidth Allocator may assert the CONTROL signal to indicate a TDM frame timing reference. Simultaneously on the bus the INFOrmation lines contain an isochronous FRAMING indicator in bit 15 (FRAMING =0). This distinguishes this event from the start of cell transmission event above. Bit 0 is also coded to indicate that the bus bandwidth should be re-allocated (SWAPped) by all attached isochronous and cell devices.

INFORMATION

The function of these sixteen (16) lines depends upon the state of the ALLOCATED and CONTROL signals.

In Unallocated (Control) State the 16 information lines provide Packet Service command and management functions.

In Unallocated (Data) State either Packet Header or Data information is exchanged.

In Allocated (Control) State the 16 information lines contain TDM frame control information or a Cell Destination Address and Cell Header octet.

In Allocated (Data) State two (full duplex) octets of information (i.e. 64 Kb/s) are exchanged or in the case of Cell transfer two transmitter octets are transferred to the selected Cell Receiver node.

BUS CLOCK

This signal, typically 16.384 KHz and/or 4.096 MHz on some physically larger systems, provides the common clock by which all data and control operations on the bus are synchronised.

It is driven by the Bus Master, and used by all attached devices to co-ordinate their operation with other devices.

REFERENCE CLOCK

This signal provides a means of conveying a port specific reference clock to the Bus Master for distribution to all attached devices via the BUS CLOCK signal—see above.

The signal is driven by an assigned reference port on one of the sub-nodes on the bus. The signal is acted upon by the Bus Master.

Basic Bus Operation

The bus is based on a TDM scheme that interleaves Isochronous, Cell and Packet traffic. It allows for dynamic changing of the isochronous/cell and packet bandwidth allocation on the backplane. The PAC bus uses un-allocated isochronous or cell bandwidth to carry a backplane packet service.

This is achieved through the ALLOCATED signal on the backplane. When an isochronous channel is active on a given slot this signal is asserted. The ALLOCATED signal itself may come from the transmitter, receiver or node manager (or a combination of these). The design of the Packet Controller on each sub-node is such that the controller is frozen for the period of the assertion of this signal (which may be for a signal or for multiple slots) and is re-enabled upon the removal of this signal.

An example of this operation is shown in Table 2.

The assertion of the ALLOCATED signal can be used to directly inhibit the passing of the Bus Clock to the packet controllers effectively causing them to lock in a frozen state. During this period isochronous/cell channels are active. Packet controllers re-emerge from this state, upon removal of the ALLOCATED signal, unaware that anything has happened.

The advantage of this scheme is that the isochronous services only have to drive the ALLOCATED signal whenever they require use of the bus and are otherwise unconcerned with any packet activity that they may be disrupting. Packet controllers are required to freeze upon assertion of the ALLOCATED signal and require no specific knowledge of when the ALLOCATED signal is to be asserted (i.e. a packet slot map is not required).

Incorporating Cells

B-ISDN conformant cells are fixed at 53 octets long and are normally conveyed in a connectionless manner. In a bus environment it is only necessary for a cell transmitter to be able to gain access to the shared bus and for a cell receiver to recognise that a particular cell in transit on the bus is addressed to it. In the PAC bus case it is also possible to support a connection oriented cell service in which cell receivers may expect to have a cell delivered to them.

The former requirement can be met by pre-allocating particular blocks of 27 isochronous slots (54 octets) as a cell space or channel. Such blocks on a 16.384 mb/s 16 bit bus provide 3 Mb/s (48 octets 8,000 times per second) of cell space out of the isochronous bus bandwidth. By sending anything up to 8,000 cells per second from 0 to 3 Mb/s of cell based traffic can be sent to one or more cell receiver nodes.

Receivers must recognise that a cell being placed on the bus by a transmitter is addressed to them. To achieve this, cells are issued (by the transmitter) with a cell begin indication on the PAC bus control signals. This BEGIN signal in Data bit 15 notifies up to 128 ATM cell receivers on the bus that the destination cell node address is located in bits 8 to 14 of the 16 bit bus and that the first octet of the cell is in the other half (bits 0 to 7). The next 26 consecutive slots on the bus complete the cell.

Transmitters that do not sustain the full pre-allocated cell bandwidth can re-allocate their unused transmit cell space by driving the ALLOCATE bus-line into a packet state. Thus unwanted cell space may be usefully re-used as packet bandwidth.

In the case of connection oriented cell transfers both the transmitter and receiver treat the 27 slots as though they are a wideband isochronous channel. In this way it is no longer necessary for the bus itself to carry a cell BEGIN indication since the connected cell receiver is already aware of the possibility that a cell may arrive.

Node Maintenance Services

Even on simple multi-port isochronous service interfaces there are many occasions when it is either desirable or essential to provide some means of selectively configuring options that may be associated with individual ports. Although speed of signalling operations is unimportant the signalling required by a Node Master to effect these configuration options is vital for proper operation of interface. The Maintenance bus function is intended to provide such a service without imposing on sub-node designers the full use of the more demanding Packet bus service.

The method used employs a Packet header frame only. The user interface to this service may be a simple dual ported RAM. This permits simple ROM-less host processors to be bus-booted and subsequent communication in other Packet Header frames.

Bus Cycles and Separate Services

The encoding the different bus cycles is described below:

| Control | Allocated | Data 15* | |
|---------|-----------|----------|---|
| 0 | 0 | X | Packet Data Transfer |
| 1 | 0 | X | Packet Sequencer State |
| 0 | 1 | X | Isoch or Cell Transfer |
| 1 | 1 | 0 | Isoch Framing Signal** |
| 1 | 1 | 1 | Cell Begin & Address** |

*Next Bus Cycle
**Cell end when word count = 27 from Cell begin

In a real design ALLOCATED and CONTROL may precede BEGIN by 1 or 2 bus CLOCK beats.

An alternative arrangement would employ an additional bus line to indicate CELL space the bus for example comprising the following lines; 16 Data; CELL; PACKET; CONTROL; CLOCK; REFERENCE CLOCK. This arrangement in conjunction with the CONTROL signal would remove the 128 cell node restriction.

The Circuit (Isochronous) Service

The Circuit Service is based on the use of a TDM bearer. It is convenient to use the conventional Wide Area Network (WAN) 8 KHz frame rate and at 16.384 MHz this results in 2048 slots in the TDM frame. Other rates are also possible.

The timing reference for the TDM frame and therefore individual isochronous channel identification, is based on sub-node detection of and subsequent alignment with a Framing slot that is identified by PAC bus by the assertion of the bus lines ALLOCATED and CONTROL.

A PAC bus Master computes bandwidth/channel allocation templates. These are then distributed, by the Master and used by all PAC bus attached devices. It is a function of the PAC bus Master's slot allocation algorithm to manage the distribution and apportionment of slots within the frame in a non-contentious way.

In describing the circuit service it is necessary to describe the central bandwidth allocation scheme on which the PAC bus is based, and then we present the templates in each sub-node on the bus and how isochronous and cell based services are distinguished and how they are made mutually compatible.

Central Slot (Bandwidth) Allocation

The PAC bus Master is responsible for managing and maintaining the allocation of bandwidth on the PAC bus to each of the three main services supported by the bus—Isochronous, Cell and Packet.

The ALLOCATED signal on the bus is normally driven by the PAC bus Master and signals to all Packet based interfaces to the bus which TDM slots are exclusively Packet. In the ALLOCATED condition the slot is not available to the Packet service and may be a CELL or an ISOCHRONOUS slot.

Templates in each PAC interface chip are the means by which sub-nodes on the PAC bus explicitly determine which TDM slots each particular sub-node owns. These templates are constructed by the PAC bus Master and individually sent to specific sub-nodes to reflect their inter-relationship with other sub-nodes on the bus. The bus Master transmits these sub-node specific templates to individual sub-nodes in a Packet service frame. Note that the ALLOCATED signal is all that a PAC interface needs to permit it to correctly recognise Packet service slots.

The proposed structure of the templates describing the allocation of both cell and isochronous slots is based on splitting into two parts the full description of the complete TDM frame (2048 slots with 8 KHz TDM frames and 16.384 MHz clocking).

The first part is a 2048 bit, slot by slot map of the full TDM frame in which a 1 in the bit map indicates that at that particular slot in the frame there is a change of channel or service.

The second part of the template is a channel identifier mapping. This associates a channel identifier with each change of service—isochronous or cell. Isochronous channels may occupy one or more contiguous slots and isochronous channels may be fragmented into more than one part within the TDM frame providing that their associated channel identifier is maintained. Normally the allocation of both Cell and Isochronous space should be sparse within the TDM frame leaving as many frequent gaps for Packet traffic as possible. This is to ensure that the Packet service is not locked out for long periods and thus that access to the Packet service is not seriously affected.

When the Isochronous channel identifier is encoded in one octet, bit 0 indicates the PAC bus INFORMATION octet—odd or even —that the sub-node should write in. On the normally full duplex connections that the PAC bus supports the CALLing sub-node writes in the ODD INFORMATION bus octet (bits 8 to 15) and the ANSWering sub-node writes in the EVEN octet (bits 0 to 7). In this way an octet interchange is effected in a single PAC bus cycle.

Thus up to 128 separate channels may be supported on any individual PAC bus sub-node, of which up to 126 may be isochronous channels of any arbitrary size. Note that in this context a single fragmented wideband isochronous channel would require more than one instance of the channel identifier to be used and this would reduce the maximum number of independent channels.

Transmitter Cell space is identified as Isochronous channel FF and in the case of a connection oriented cell service the receiver CELL space is identified as channel FE. For example Table 3 shows the PAC bus sub-node template for:

Isoch Channel 27 in slots 2 and 3 (128 Kb/s);

Transmit Cell (FF) in slots 6 to 33;

Isoch Channel 9 in slot 2047; and

Packet Info in Slots 1, 4, 5, 35 to 2046

The following points should be noted in Table 3.

1. The Bit Map requires 256 octets.
2. Up to 128 fragmented Isochronous channels can be identified in 256 octets in which one bit indicates the CALL/ANSW selection for full duplex connections.
3. There are only 3 Channels identified, namely 9, 27 & FF (Cell Transmit).
4. Slot 34 is an Isochronous slot allocated to another sub-node.

Dynamic (Re)-Allocation of Channels

To permit dynamic non-disruptive re-allocation of channels on the backplane there are foreground and background templates. The former is used to parse TDM frames actually on the backplane whilst the latter is used to establish in each attached sub-node a new template, prior to dynamically changing the bandwidth allocation.

The Isochronous Channel Identifier FF is the common 3.072 Mb/s transmit CELL channel. For a Connection-Oriented Cell service, isochronous channel FE may be used to indicate in Cell Receivers which slots in the TDM frame a sub-node should read in a cell.

Templates encoded in this manner can be contained within 512 octets. This is within the maximum size for PAC bus Packet Service frames. Therefore sub-node specific Template Descriptors are passed in Packet service Virtual Circuit Identifier FF to the addressed node for entry into the background template store.

When the PAC bus Master has sent New Templates to all affected sub-nodes and these are stored in each sub-node's background Template it is necessary to swap templates. This swapping brings into effect the new allocation of bus bandwidth and is accomplished by the PAC bus Master sending a Framing (slot 0) SWAP signal to copy the newly loaded Background template in each sub-node to the Foreground. All attached sub-nodes change templates synchronously on the TDM frame boundary.

Pre-allocated Cell space is not expected to be altered very often, it is only Isochronous space that will change dynamically. This of course alters the Packet bandwidth.

The Cell Service

Cells are fixed length blocks of information. They are commonly used in B-ISDN as the bearers of Asynchronous Transfer Mode services. Cells are 53 octets in length of which 5 octets are a cell descriptor and 48 octets are user information.

Cells are employed by B-ISDN as a means of conveying data very rapidly end to end across a switched network. This is achieved by dynamically switching and routing the cell as it enters an intermediate network node to an appropriate exit port on the node.

In the case of bus based systems, the backplanes themselves provide no inherent switching capability, they are simply a serially reusable common distribution mechanism. Nevertheless they can be used to sequentially transfer cells from one bus node to another and thereby emulate switching. Note that this is not the same as cell switching or routing on the fly as in B-ISDN.

In a based node there may be several instances of cell-based service interfaces—802.6, SMDS (U.S. and European) or B-ISDN itself. The PAC bus Cell service provides a means of cell transfer amongst such interfaces.

Whilst B-ISDN cell based bearer services might convey very high information rates, this is normally as a result of the aggregation of many traffic flows from several lower rate attachments. Typically these individual attachments will be designed and/or configured to support average and peak levels of traffic well below the bearer rate itself. Thus a B-ISDN (SONET—155 Mb/s) attachment may be in support of only 10 Mb/s average and 20 Mb/s peak.

On the PAC bus, as noted above in the Circuit Service description section, we can similarly allocate a contiguous set of isochronous slots to be repeated in each TDM frame to bear a complete cell. One set of 27 slots (53 octets of cell+one address octet) recurrent in each basic TDM 8 KHz bearer frame will support a total user information rate of 48×8×8000=3.072 Mb/s. Higher levels of cell traffic can be supported simply by allocating more blocks of cell space within each TDM frame. With a 16.384 MHz backplane there are 2048 slots on the bus and at the expense of all the isochronous and packet bandwidth on the bus, up to 230 Mb/s of cell based user traffic could be carried. Cells when conveyed in 27 contiguous slots are a worst case (typically 2 μsec. at 16.384 Mb/s) for Packet service access.

The problem that remains to be solved is the means of sharing the bus itself amongst the competing requirement of the intercommunicating interfaces attached to the bus. The PAC bus solution to this problem is to pre-allocate according to the traffic needs of each attachment an appropriate amount of exclusive peak transmit cell space from within the isochronous TDM frame. Transmitters then write onto the bus if and only if they have a cell to transmit. All the cell based access interfaces check an added address field in the first word of the cell on the bus to see if it is for them. The addressed cell based interface then reads the subsequent 26 words to complete the cell transfer.

This mechanism will work only if the cell based interfaces have mutually exclusive cell spaces on which to transmit. This is achieved by treating cell space in a similar way to isochronous channel space on the bus. Cells may be seen as wideband isochronous channels in which word transfer rather than octet exchange takes place.

To realise this requirement for a cell transmit allocation isochronous channel FF may be equated to cell space in each PAC transmitter. When less than peak (allocated) cell traffic is to be carried some of the cells cannot be filled by the transmitter. In this case the cell transmitter drives the PAC bus ALLOCATED line to the false state and by so doing recovers what would be the otherwise unused cell space for use as packet bus space and nothing is wasted.

Alternatively it is possible to pre-allocate (inform might be a better description) receivers to accept a block of isochronous slots as receive cell space. This can be seen as a connection oriented version of the above connectionless cell transfer model in which isochronous channel FE for example is the receive cell channel. An advantage of this arrangement is that it is no longer necessary to signal on the bus that particular slots are cell space since a receive cell isochronous slot allocation is known to the receiver. A disadvantage is that there is no collision avoidance mechanism for the common requirement of many transmitters to one receiver, so that only one to one communication is readily implementable.

A less palatable alternative would be to operate a packet-bus-like arbitration scheme for cell transfer contention avoidance. This adds greater complexity and access delays for no tangible benefit as compared with the pre-allocated scheme described above.

The Packet Service

The Packet Service provides a very fast inter-processor packet transfer service with very low host processor overhead. It does so whilst maintaining a high level of integrity in the face of live board exchange, and providing a more economical solution than that offered by commercial shared memory buses.

There are only two activities needed to carry packet service frames over the shared bus; bus access control and information (packet) transfer.

Access control is by means of a distributed arbitration scheme in which attached units (users) requiring access to the bus vie with one another for the use of the bus. The scheme is fair in that users are required to queue for use of the service. That is, the longer a user has been waiting to use the bus the sooner it will be serviced. Certain urgent situations are catered for where queue jumping is allowed and mechanisms are incorporated to allow this—it is not intended that this should be the norm.

When a user has obtained the use of the bus through arbitration it may use the bus to transfer a stored packet to one or more target destination(s) on the bus.

An important feature of this service is that arbitration and user information transfer are accomplished within the data width of the bus. Save for a synchronising clock line only one single additional line is required in addition to the data lines—the CONTROL line. This signal, when asserted, changes the state of the bus. A code simultaneously asserted on the data lines is used to define the new state. Very few states are required to deliver a highly featured information frame transfer service. The limited number of possible state transitions makes the bus very predictable and therefore resilient.

Different types of frames allow optimal operation in different circumstances. A packet header frame carries service control information and a final checksum of both the header and data parts of the packet are sent at the end of each part to assure data integrity. As with other packet service types in a communications environment the service protocol is carried within the packet itself.

Unlike the circuit and cell services which are (pre) ALLOCATED bandwidth (slots) in the TDM frame the packet service is not pre-allocated bandwidth in any way. Instead it utilises the bandwidth which remains unused by the isochronous and cell services.

In order to achieve this the packet service controller operations can be frozen in frame transfer state whilst either a pre-allocated cell or circuit slot is transferred over the bus. In this parallel bus implementation, an additional ALLOCATED line is provided on the backplane which is driven by a circuit or cell service provider during those times which they use the bus. It is this ALLOCATED signal that the packet controller inspects to determine if it should freeze.

The Maintenance Service

Operationally the maintenance service is a sub-set of the packet service. Long packets which are sent between fast data stores external to the PAC chip (typically video RAMs are used) are reserved primarily for high throughput user data.

The Maintenance service uses short Header packets which are fully buffered (may originate and terminate) within the communicating PAC chips and rely on a few hundred bytes of internal store. These Maintenance frames are used primarily for a lower rate node control and management service. The short packets may be connectionless (generally broadcast) or connection oriented with acknowledgements from addressed receivers, and the normal Packet service checksum mechanism is provided to assure Maintenance service integrity.

The maintenance service interfaces with a local host processor through a simple host interface which affords the host full random access to the internal short packet store. A higher level protocol outside the scope of the PAC chip is carried in the short maintenance packets between communicating hosts. This may be utilised in support of maintenance functions of which the following are shown by way of example:
* configuration
* dumb card control and status reporting
* initialisation
* error reporting
* boot code download
* reduced rate (non video RAM) user service
* allocated slot usage information (auxiliary template information)

The Maintenance service frames are identified as Packet service Virtual Circuit Identifier (VCI) number FF. (Note that the Maintenance service is like the Isochronous Template Service (VCI=FE) which also uses Packet service frames).

The PAC Bus—A Serial Implementation

Current IEEE 802.9 Draft 15 Description

The current IEEE 802.9 Standard Draft 15 provides both Packet and Isochronous User services. However there is no support for Cell services.

IEEE 802.9 employs a bit serial full-duplex TDM bearer over which several control and distinct user channels are supported. One of these is an IEEE 802 conformant Packet service, implemented by the IEEE 802.9 Media Access Control (MAC).

In IEEE 802.9 the SYN (Synchronise), TDM and the HMCiH-Multiplex) fields of the TDM frame are used within the OSI Physical layer to establish and maintain the TDM frame and to multiplex numerous isochronous bearer channels (see Table 4) These include the isochronous user channels D, $B_1$, $B_2$ and optional C channels, as well as the AC channel and P channel which together support the IEEE 802 packet service.

The P channel consists of all those slots in the payload portion of the TDM frame that are not allocated to optional isochronous C channels. The Access Control (AC) channel is a bearer for a Request/Grant protocol. This provides information to permit an undefined arbitration process to select one of many terminals attached to a shared Access unit. In addition the AC field provides a Start of Frame (SoF=1) signal that indicates that the beginning of a MAC (packet) frame commences in the first P channel slot within the following Payload.

The MAC frame commences with a Start MAC frame Qualifier (SMQ), that improves the detection of false MAC frame starts. TDM frames that do not contain the beginning segment of a MAC frame have an SoF=0.

Support for a Cell Service

It is important that access to a cell bearer should have well defined and tightly bounded latency characteristics. The IEEE 802.9 MAC service does not fulfill such a requirement. Two potential solutions are:
1. Subject to careful allocation of Isochronous bearers within the Payload, a Cell (53 contiguous octets) can be carried as a fat Isochronous channel; or
2. A Cell could be carried within the P channel portion of the TDM frame, in place of a portion of the MAC frame.

There are potentially serious inefficiencies arising out of the method suggested in the first case above. These are due to the great reduction of the space within the payload that would remain for the P-channel service, and also the fact that typical cell usage is very peaky. This implies that most pre-allocated cell space would go un-used if provision were to be made for peak information rates.

The second alternative—use P-channel space—requires some form of pre-emptive mechanism if acceptable cell access latency is to be provided. This can be achieved by way of the Access Control channel.

If the SoF bit in the AC field is respecified to encompass not only Start of MAC Frame but also the Start of a Cell it would be possible to steal P-channel bandwidth on demand whenever it is needed for the transport of a cell. There is then of course a need to distinguish between the Start of a MAC Frame and the stealing of Cell Space. This can be achieved by means of respecifying the SMQ field in the current MAC frame as a Start of Payload Qualifier (SPQ).

The following changes to the IEEE 802.9 TDM and MAC frames are required. These changes are shown in Table 5:
1. Remove one of the D/15 Reserved field octets;
2. Redefine the AC field's SoF bit to indicate the Start of a Payload Change—at the beginning of the P (Payload) space.
3. Redefine the MAC frame's SMQ field to be one octet in length and to become a Start of Payload Qualifier (SPQ).
4. Define a set of SPQs that indicate:
   (a) MAC frame begins
   (b) Cell follows
   (c) Other—to be defined
   (d) Other—to be defined
5. At higher line rate(s) dynamic bandwidth allocation facilities can be used to extend and repeat the AC field at say every 64 octets. Note that these additional AC fields are not separate channels; they are the same AC channel that is included in the header.

With these new definitions and a line rate of 4.096 Mb/s (a total of 64 slots in the TDM frame) there are 56 slots for Payload. So we can carry an ATM Cell (of 53 octets) in a single TDM frame payload.

At 20.48 Mb/s and using a TDM frame structure with extra AC fields repeated say 4 more times, the full TDM frame is capable of supporting 5 cells. This offers a maximum cell bandwidth of approximately 15 Mb/s as shown in Table 6. In any of the five segments of the TDM frame each commencing with an AC field, the SoF bit may signal that:

| | | |
|---|---|---|
| 1. | SoF = 0 - | Payload is Packet (Idle or Continuation of Frame) |
| 2. | SoF = 1 and SPQ = MAC - | MAC Frame begins in the next Packet Payload slot |
| 3. | SoF = 1 and SPQ = Cell - | Cell begins in the next Packet Payload slot. |
| 4. | SoF = 1 and SPQ = Other. | Payload is for other Services. |

Cell transmitters may contend for access to these cell channels. Requests for allocation of cell space may be made when a transmitter has a cell ready for transmission by placing a Send Cell Request signal on the bus. A Send Cell Enable response from the Bus Master would then indicate pre-allocation of a cell channel to a cell transmitter and identify the cell channel. The maximum cell bandwidth used on the bus can thus be controlled by the Bus Master.

To appreciate the advantages of these changes it is easiest to consider the case where all the payload bandwidth is Packet and then examine the sequence of 4.096 Mb/s TDM frames shown in Table 7.

In this example TDM frame 2 contains an SoF=1 and the first P-channel octet is an SPQ=P for Packet, indicating the beginning of a MAC frame.

In TDM frame 3 the continuation of the MAC frame is interrupted by a Cell service payload. This is indicated by an SoF=1 (again) but this time with an SPQ=C for Cell.

In TDM Frame 4 the MAC Frame that had been started in TDM frame 2 is resumed.

Architectural Considerations

Figure 2:
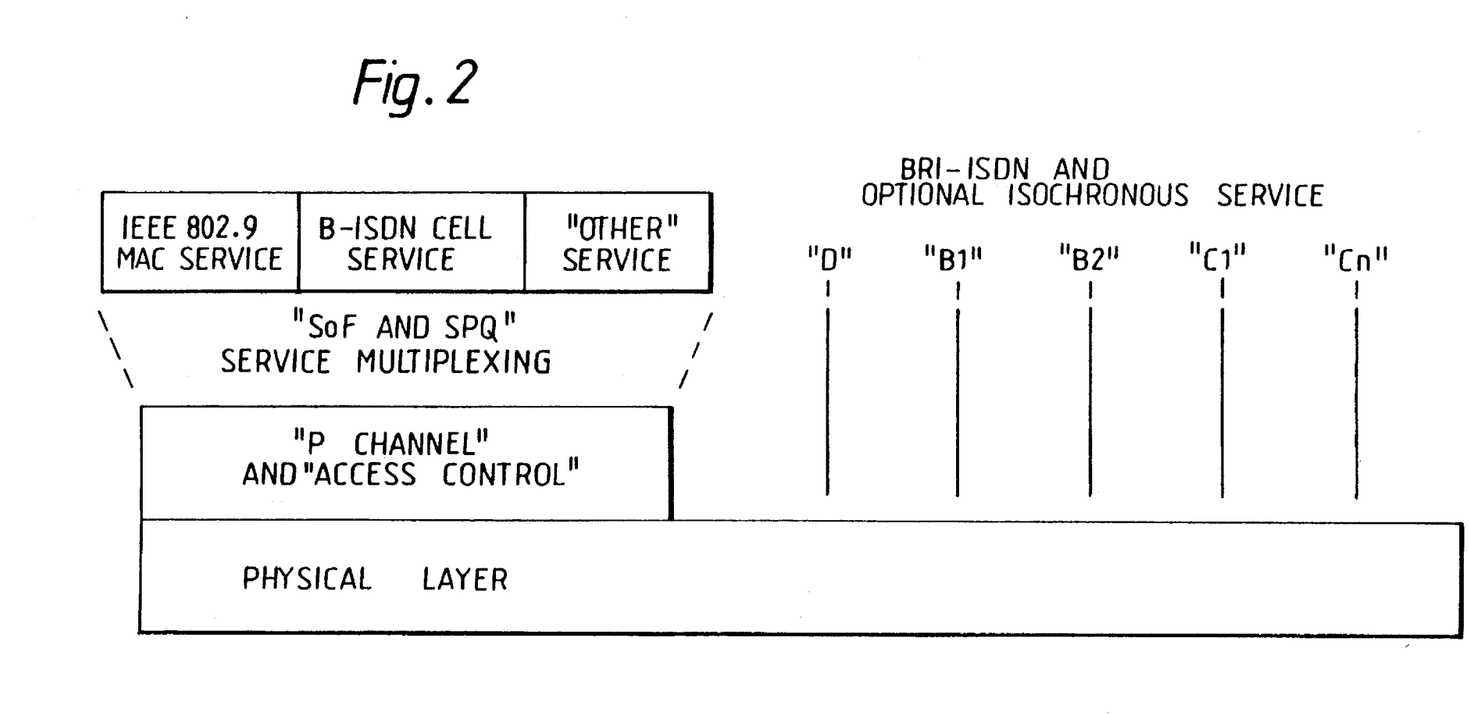
FIG. 2 is a diagram of the architectural layering of a controller according to the invention.

Architecturally the proposed Cell service may be seen as pre-empting the 802.9 MAC's use of the P-channel space within the TDM frame. This notion is illustrated in the layering diagram in FIG. 2. The P channel and the Access Control channels provided by the PHYsical layer are acted upon by the segmenting effects of the SoF AC field and the SPQ field of the P channel segments.

By providing a set of SPQ values, separate services and start of new payload qualification capabilities can be combined. For example a single octet of SPQ could encode say four services. This would provide a high degree of confidence that an SoF in the preceding AC field was valid, whilst at the same time selecting up to four different services.

The set of SPQs might then become:

| | Service | Coded As |
|---|---|---|
| 1 | IEEE 802 MAC | 11110000 |
| 2 | CCCITT LAPD | 00001111 |
| 3 | CCITT B-ISDN CELL | 11000011 |
| 4 | Other | 00111100 |

This exemplary coding could identify four separate services and offer one or two bit error detection and correction with some measure of qualification.

The PAC Bus Interface

Figure 3:
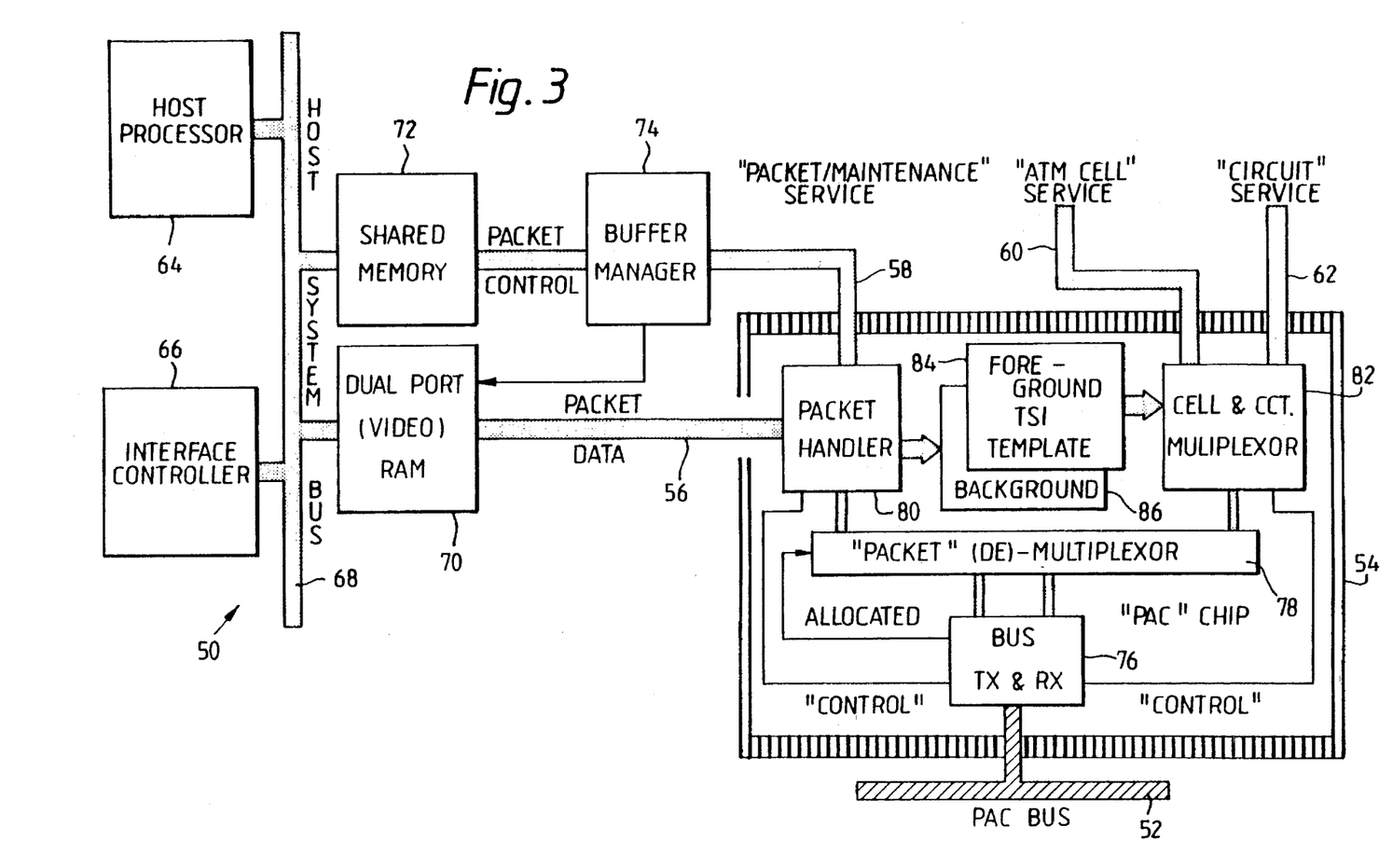
FIG. 3 is a block diagram of a bus controller according to the invention.

FIG. 3 shows a block diagram of a PAC bus interface in which a host system 50 is interfaced to a PAC bus 52 by means of a PAC bus controller 54. The controller 54 has inputs for packet data 56, a maintenance service 58, an ATM cell service 60 and an isochronous circuit service 62. In the figure only connections between the host and the packet and maintenance inputs are shown by way of example.

The host system comprises a host processor 64 and an interface controller 66 coupled by a local host system bus 68 to a Dual Port Video RAM 70 which, under the control of the host processor via a small shared memory 72 and a buffer manager 74, forms a buffer for transmitting packet data on demand to the PAC bus controller 54. The buffer manager 74 also provides the maintenance service 58 to the bus controller 54.

The PAC bus controller comprises a bus transmit and receive unit 76 connected for data transfer between the PAC bus 52 and a packet multiplexor/demultiplexor 78. The multiplexor is connected to a packet handler 80 for data transfer to and from the packet data input 56 and the maintenance service input 58, and to a cell and circuit multiplexor 82 for data transfer to and from the cell and circuit service inputs 60, 62.

The PAC bus controller also comprises foreground and background template stores 84, 86 readable by the packet handler 80 and cell and circuit multiplexor 82.

The packet handler 80 and the cell and circuit multiplexor 82 are linked by control lines to the bus transmit and receive unit 76 for controlling reading of signals from and writing of signals to the PAC bus 52. An 'allocated' signal line also links the bus transmit and receive unit to the packet (de)multiplexor 78 for inhibiting packet transmission and 'freezing' the packet service when an 'allocated' signal is present on the PAC bus.

The PAC bus controller 54 as shown in FIG. 3 may be implemented on a single PAC chip.

Figure 4:
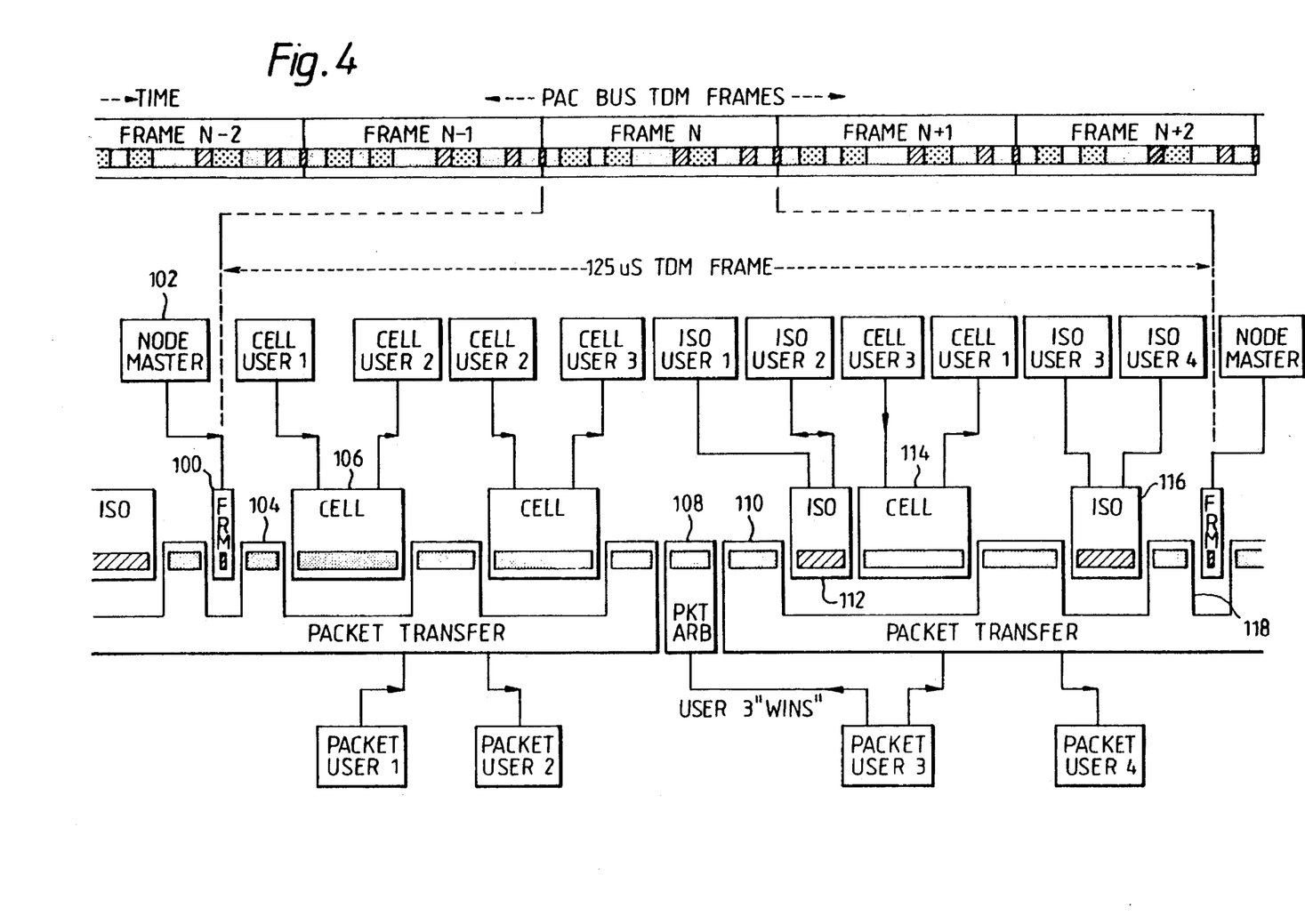
FIG. 4 is a diagram of an example of the operation of the bus according to the invention.

FIG. 4 is a diagram of an example of PAC bus operation showing a series of TDM frames and an expanded view of a particular frame and the sequence of signals transmitted within it. The frame, N, is initiated by a framing signal 100 placed by the node master 102 in slot 0 of the frame. The first few slots after the conventional frame initialisation slots are used for packet transfer 104. This data is sent, as a result of earlier arbitration, from packet user 1 to packet user 2. A cell channel 106 pre-allocated to cell user 1 then follows, which cell user 1 uses to transmit a cell to cell user 2. Cell user 2 is identified by an address in the first slot of the cell. During cell transmission an allocated signal is asserted on the allocate line. When the cell transmission is complete, the allocate signal is removed and packet transmission resumes. Transmission of a cell from cell user 2 to cell user 3 follows similarly.

When the packet transmission from packet user 1 to packet user 2 ends, packet arbitration is required to determine ensuing packet access. This is achieved by arbitration 108 in the packet channel. Packet user 3 wins and sends packet data 110 to packet user 4 until interrupted by an isochronous channel 112 allocated for duplex communication between ISO user 1 and ISO user 2. The ISO channel is followed by a cell channel 114 pre-allocated to cell user 3 which sends a cell to cell user 1. During the isochronous channel 112 and the cell channel 114 packet transmission is inhibited by an allocated signal asserted on the allocate channel of the bus. Packet transfer is then resumed, but is interrupted once more by an isochronous channel 116 allocated to ISO user 3 and ISO user 4 before the frame end 118.

TABLE 1

SIGNALS ON A PARALLEL INTERFACE PAC BUS

| ALLOCATED | | | | UNALLOCATED | | | |
|---|---|---|---|---|---|---|---|
| DATA | | CONTROL | | DATA | | CONTROL | |
| iso | cell | iso | cell | packet | | packet | |
| CALL 7 | ODD 7 | FRAME | BEGIN | DATA 15 | | QUAL 11 | |
| CALL 6 | ODD 6 | — | R | DATA 14 | | QUAL 10 | |
| CALL 5 | ODD 5 | — | X | DATA 13 | | QUAL 9 | |
| CALL 4 | ODD 4 | — | — | DATA 12 | | QUAL 8 | |
| CALL 3 | ODD 3 | — | N | DATA 11 | | QUAL 7 | |
| CALL 2 | ODD 2 | — | O | DATA 10 | | QUAL 6 | |
| CALL 1 | ODD 1 | — | D | DATA 9 | | QUAL 5 | |
| CALL 0 | ODD 0 | — | E | DATA 8 | | QUAL 4 | |
| ANSW 7 | EVEN 7 | — | — | DATA 7 | | QUAL 3 | |
| ANSW 6 | EVEN 6 | — | B | DATA 6 | | QUAL 2 | |
| ANSW 5 | EVEN 5 | — | Y | DATA 5 | | QUAL 1 | |
| ANSW 4 | EVEN 4 | — | T | DATA 4 | | QUAL 0 | |
| ANSW 3 | EVEN 3 | — | E | DATA 3 | | STATE 3 | |
| ANSW 2 | EVEN 2 | — | — | DATA 2 | | STATE 2 | |
| ANSW 1 | EVEN 1 | — | 0 | DATA 1 | | STATE 1 | |
| ANSW 0 | EVEN 0 | SWAP | | DATA 0 | | STATE 0 | |

} DATA BUS (INFORMATION LINES)

ALLOCATED/UNALLOCATED —
CONTROL/DATA —
BUS CLOCK —
REFERENCE CLOCK —

} SIGNALLING AND CLOCK LINES

TABLE 2

EXAMPLE OF INTERRUPTION OF PACKET TRANSMISSION BY AN ISOCHRONOUS TRANSMISSION

| | | |
|---|---|---|
| ISO DATA | | I1 I2 I3 I4 |
| PACKET DATA | P1 P2 P3 P4 P5 P6 FREEZE P7 P8 | |
| TDM BUS | P1 P2 P3 P4 P5 P6 I1 I2 I3 I4 P7 P8 | |
| ALLOCATED | N N N N N N Y Y Y Y N N | |

TABLE 3

PAC BUS SUB-NODE TEMPLATE

| | TDM Frame Slot | Isochronous Channel "27" 128 kb/s | | | | | ← Cell Space "1" → | | | | REST OF TDM FRAME | Chanl. "9" 64kb/s | |
|---|---|---|---|---|---|---|---|---|---|---|---|---|---|
| | 0 | 1 | 2 | 3 | 4 | 5 | 6 | 33 | 34 | 35 | | 2046 | 2047 |
| TDM Bit Map | 1 | 0 | 1 | 0 | 0 | 0 | 1 0 ...... | 0 | 0 | 0 0 | | 0 0 | 1 |
| Channel ID | - | - | "27 27" | | - | - | "FF "FF ...... | "FF | FF" | - | - | - - | "9" |
| "Packet" | 0 | 1 | 0 | 0 | 1 | 1 | 0 0 | 0 | 0 | 0 | 1............... | 1 1 | 0 |

TABLE 4

KNOWN IEEE 802.9 FRAME STRUCTURES

IEEE 802.9 Draft 15 - 4.096 Mb/s TDM Frame Structure

| 0 | 1 | 2 | 3, 4 | 5 | 6 | 7 | 8 | 9 | 63" |
|---|---|---|------|---|---|---|---|---|-----|
| SYN | TDM | HMC | Rsv | D | B1 | B2 | AC | Payload | |

IEEE 802.9 draft 15 - MAC Frame Structure

| 0, 1 | 2 to | 50?? | (4) | |
|------|------|------|-----|---|
| SMQ | MAC Hdr. | L-PDU INFORMATION - 0 TO 5108 octets | FCS | |

TABLE 5

A FRAME STRUCTURE FOR A PAC BUS

| 0 | 1 | 2 | 3 | 4 | 5 | 6 | 7 | 8 | 63" |
|---|---|---|---|---|---|---|---|---|-----|
| SYN | TDM | HMC | Rsv | D | B1 | B2 | AC | Payload | |

| 0 (4) | 1 – ? | | |
|-------|-------|---|---|
| "MAC" | MAC Hdr | INFO | FCS |
| "Cell" | "At Least" 53 Bytes | | |
| Other | — | | |

When SoF = "0"
- TDM Payload is Packet and/or Isochronous

When SoF = "1" & SPQ = "MAC"
- Packet Payload Begins and/or Isochronous

When SoF = "1" & SPQ = "Cell"
- TDM Payload is Cell

When SoF = "1" & SPQ = Other?
- TDM Payload is "Another" Service!

TABLE 6

SECOND PAC TDM FRAME STRUCTURE

| 0 | 1 | 2 | 3 | 4 | 5 | 6 | 7 | 8 |
|---|---|---|---|---|---|---|---|---|
| SYN | TDM | HMC | Rsv | D | B1 | B2 | AC | Possible "Cell" Payload Space |
| 64 | | | | | | 70 | AC | Possible "Cell" Payload Space |
| 128 | | | | | | 134 | AC | Possible "Cell" Payload Space |
| 196 | | | | | | 198 | AC | Possible "Cell" Payload Space |
| 256 | | | | | | 262 | AC | Possible "Cell" Payload Space |

TABLE 7

EXAMPLE OF A TDM FRAME SEQUENCE

⟵——— TDM Frame 1 ———⟶⟵——————— TDM Frame 2 ———————⟶⟵——————— TDM Frame 3 ———————⟶⟵

STHrDBBA________..______ STHrDBBAPpppppppppppppppp .. ppppppSTHrDBBACcccccccccccccccc .. ccccppSTHrDBBApp ..

LEGEND: - "sTHRDBB" = Octets 0 to 6 of Frame - Header  "A" = Access Control Field with SoF = "0"
"______..______" = "Inter MAC Frame Gap"  "A" = Access Control Field with SoF = "1"
"P" = SPQ for "Begin MAC Frame"  "ppp.ppp" = MAC Frame Pocket Information.
"C" = SPQ for "Begin of a Cell"  "ccc.ccc" = 53 Octets of Cell Information.

What is claimed is:

1. A communications network, comprising:
   a framed, time-division-multiplexed, synchronous bus, including:
      an information channel on which communication in a first mode and communication in a second mode can be selectively effected; and
      an allocate channel;
      said information channel having a bandwidth and being pre-allocated for communication in said second mode, and said allocate channel having asserted thereon an allocated signal if said bandwidth of said information channel is being used for communication in said second mode; and
      a controller coupled to the framed, time-division-multiplexed, synchronous bus, wherein
   said controller is a state machine switchable between states corresponding respectively to said first and second modes of communication on said bus; and said controller is responsive to said allocated signal to inhibit communication in said first mode using said bandwidth of said information channel when said allocated signal is asserted and not to inhibit communication in said first mode using said bandwidth of said information channel when said allocated signal is not asserted.

2. A communications network as defined in claim 1, wherein a service qualification is associated with said allocated signal to identify a mode of communication required as said second or said first mode on said bus.

3. A communications network as defined in claim 1, wherein said allocated signal is asserted on said allocate channel at a short time before a start of a communication in said second mode.

4. A communications network as defined in claim 1, in which said information and allocate channels are time-division-multiplexed channels.

5. A communications network as defined in claim 1, in which said bus comprises separate bus lines for carrying said information and allocate channels respectively.

6. A communications network as defined in claim 5, in which said bus comprises a control line, an allocate line and an information line, in which signals on said information line are interpreted as control signals when a control signal is asserted on said control line and as data signals when no control signal is asserted on said control line.

7. A communications network as defined in claim 1, in which said first mode is packet communication and said second mode is ATM cell communication.

8. A communications network as defined in claim 1, in which said first mode is packet communication and said second mode is isochronous communication.

9. A communications network as defined in claim 1, in which said first mode is packet communication and said second mode includes both isochronous and cell communications, said bus comprising mutually exclusive channels to which said isochronous and cell communications are allocated.

10. A communications network as defined in claim 1, wherein an ATM cell transmission having a plurality of cells is transmitted on a cell channel comprising a contiguous series of slots within a channel within a frame.

11. A communications network as defined in claim 10, wherein a specified cell channel within a frame is pre-allocated to said controller.

12. A communications network as defined in claim 11, wherein a bus master is coupled to said bus and said pre-allocation is controlled by said bus master in response to a request by the controller.

13. A communications network as defined in claim 11, wherein said pre-allocated cell channel is exclusive to said controller.

14. A communications network as defined in claim 11, wherein said controller if it does not transmit a cell in a cell channel allocated to it, asserts a signal in said allocate channel to indicate that slots of said cell channel are available for packet communication.

15. A communications network as defined in claim 1, wherein a slot or slots are allocated in a frame to said controller for isochronous circuit communication.

16. A communications network as defined in claim 15, wherein said controller, if it does not transmit isochronous circuit data in a slot allocated to it for such communication, asserts a signal in said allocate channel to indicate that said slot is available for packet communication.

17. A communications system, comprising:
    a framed, time-division-multiplexed, synchronous bus, having:
       an information channel on which communication in a first mode and communication in a second mode can be selectively effected; and
       an allocate channel;
       said information channel having a bandwidth and being pre-allocated for communication in said second mode, and said allocate channel having asserted thereon an allocated signal if said bandwidth of said information channel is being used for communication in said second mode; and
    a controller coupled to the framed, time-division-multiplexed, synchronous bus, wherein said controller is a state machine switchable between states corresponding respectively to said first and second modes of communication on said bus, and said controller is responsive to said allocated signal to inhibit communication in said first mode using said bandwidth of said information channel when said allocated signal is not asserted; and
    a store storing a foreground template and a background template, said controller having a read and/or write access status in respect of each slot of each frame and said foreground template defining said access status for each said slot, and a means for swapping said foreground template for said background template in response to a swap signal on said bus.

18. A communication system as defined in claim 17, further comprising a bus master coupled to said bus and said background template is updated in response to data received by said controller from said bus master.

19. A communication system as defined in claim 18, in which background template data is transferred on said bus in a packet channel to assure data integrity despite bus transmission errors.

20. A communications system as defined in claim 17, wherein the first mode comprises packet communications and the second node comprises both isochronous and cell communications, and said bus comprising mutually exclusive channels to which said isochronous and cell communications are allocated.

21. A communication system comprising:

a framed, time-division-multiplexed bus;

a plurality of communications controllers; and a corresponding plurality of engines, each one of said engines being coupled to said bus by means of a corresponding one of said communications controllers for controlling the writing of signals to the bus from said engine and the reading of signals from the bus to said engine, said bus having an information channel on which communication in a first mode and a second mode can be selectively effected, and an allocate channel on which one of said communications controllers can assert an allocated signal;

and each one of said communications controllers being a state machine switchable between a first state corresponding to said first mode of communication on said bus and a second state corresponding to said second mode of communication on said bus;

in which said information channel is pre-allocated for communication in said second mode and in which communication in said first mode on said information channel can be inhibited to allow communication in said second mode on said information channel, said one of said communications controllers, on transmitting, or writing, to said bus in said second mode on said information channel, asserting an allocated signal on said allocate channel to signal to others of said communications controllers on said bus the inhibition of communication in said first mode on said information channel.

* * * * *